United States Patent
Spielman et al.

(10) Patent No.: US 9,067,788 B1
(45) Date of Patent: Jun. 30, 2015

(54) APPARATUS FOR HIGHLY EFFICIENT COLD-PLASMA OZONE PRODUCTION

(71) Applicants: Rick B. Spielman, Tijeras, NM (US); Alan E. Hill, Albuquerque, NM (US); Scott R. Wilson, Corrales, NM (US)

(72) Inventors: Rick B. Spielman, Tijeras, NM (US); Alan E. Hill, Albuquerque, NM (US); Scott R. Wilson, Corrales, NM (US)

(73) Assignee: Rick B. Spielman

( * ) Notice: Subject to any disclaimer, the term of this patent is extended or adjusted under 35 U.S.C. 154(b) by 0 days.

(21) Appl. No.: 14/070,087

(22) Filed: Nov. 1, 2013

Related U.S. Application Data

(60) Provisional application No. 61/721,222, filed on Nov. 1, 2012.

(51) Int. Cl.
*C01B 13/11* (2006.01)

(52) U.S. Cl.
CPC ..................... *C01B 13/11* (2013.01)

(58) Field of Classification Search
CPC ........................................................ C01B 13/11
USPC ................. 422/186.04, 186.07, 186.19, 186.2
See application file for complete search history.

(56) References Cited

U.S. PATENT DOCUMENTS

| | | | |
|---|---|---|---|
| 607,007 A | 7/1898 | Andreoli | |
| 882,509 A | 3/1908 | Wood | |
| 1,845,670 A | 2/1932 | Lebrun | |
| 2,010,081 A | 8/1935 | Hartman | |
| 3,081,215 A | 3/1963 | Held et al. | |
| 3,801,791 A | 4/1974 | Schaefer | |
| 3,891,561 A | 6/1975 | Lowther | |
| 4,079,260 A | 3/1978 | Dmitriev et al. | |
| 4,213,838 A | 7/1980 | Lowther | |
| 4,417,966 A | 11/1983 | Krauss et al. | |
| 4,461,744 A | 7/1984 | Erni et al. | |
| 4,614,573 A | 9/1986 | Masuda | |
| 4,619,763 A | 10/1986 | O'Brien | |
| 4,882,129 A * | 11/1989 | Andrews et al. | ........... 422/186.2 |
| 5,211,919 A * | 5/1993 | Conrad | ..................... 422/186.07 |
| 5,433,927 A * | 7/1995 | Mausgrover et al. | .... 422/186.07 |
| 5,549,874 A | 8/1996 | Kamiya et al. | |
| 6,284,204 B1 | 9/2001 | Cole et al. | |
| 6,730,277 B2 | 5/2004 | Lee et al. | |
| 6,932,946 B2 | 8/2005 | Shinjo et al. | |
| 7,067,102 B1 * | 6/2006 | Visser | ........................... 423/581 |
| 2010/0187092 A1 * | 7/2010 | Weist et al. | ................... 204/176 |

* cited by examiner

*Primary Examiner* — Kishor Mayekar
(74) *Attorney, Agent, or Firm* — James Creighton Wray

(57) ABSTRACT

An apparatus for efficiently generating ozone in dry air or in oxygen at about 1 bar pressure. The apparatus generates a uniform cold plasma having no arcs or localized discharges that fills the entire generator volume. Electrical pulses having a peak voltage of approximately 20 kV, pulse width of approximately 20-ns FWHM, and repetition rate of approximately 10 kHz drive the generator. Short pulses apply voltage to the generator on a short time scale compared to the time required to form an arc-like discharge, and at an electric field strength many times over DC breakdown, which is not achievable with long electrical pulse widths. The generator is optimized for cool, UV-free operation. Dimensions of the generator are adjusted to optimize production of ozone by tailoring the distribution function of the electrons in the cold plasma. Overall efficiency of the generator approaches 50% of the theoretical quantum efficiency of generating ozone.

20 Claims, 3 Drawing Sheets

End View

Side View

APPARATUS FOR HIGHLY EFFICIENT COLD-PLASMA OZONE PRODUCTION

This application claims the benefit of U.S. Provisional Application No. 61/721,222, filed Nov. 1, 2012, which is hereby incorporated by reference in its entirety as if fully set forth herein.

BACKGROUND OF THE INVENTION

The invention relates generally to the field of ozone production in air or in oxygen using electrical techniques. There is a long history of ozone production including numerous patents and an extensive literature base.

Discussion of publications herein is given for more complete background of the scientific principles and is not to be construed as an admission that such publications are prior art for patentability determination purposes.

Existing electrical ozone production techniques in air and oxygen focus on coronal discharge (CD), dielectric barrier discharge (DBD), electrolytic, or UV methods. More than two hundred and fifty patents for specific apparatuses have been granted over past several decades. All of the larger ozone generators that are currently marketed use either CD or DBD techniques. Smaller generators often use inefficient UV ozone production. Electrolytic techniques are common in water environments.

There is an immediate need to improve the electrical efficiency of ozone production. Industrial applications including potable water purification, industrial water treatment, chemical processing, and agricultural treatment require continuous, large volumes of ozone. The absolute efficiency of ozone production becomes a major cost factor for these high-volume applications. In addition, the use of dry air rather than oxygen would be a major cost savings for many applications in which the absolute maximum concentration of ozone is not critical due to the energy, hardware, and maintenance costs of oxygen concentrators.

A seminal coronal discharge (CD) patent was U.S. Pat. No. 607,007 in which planar plates or screens were separated by a single glass sheet. In that case a DC voltage was applied between the two electrodes and a coronal discharge was set up with the glass as the barrier preventing a run away discharge. That patent was followed by a host of CD patents over the years. One of the key patents was U.S. Pat. No. 882,509 in which CD from metallic brush tip was described. U.S. Pat. No. 1,845,670 was the first patent in which AC voltages were clearly described and a cylindrical geometry with a single insulator and spiral inner electrode was used. U.S. Pat. No. 3,081,215 was the first patent to describe CD ozone generators with a stack of planar generators and was the first to mention the importance of no air gaps between the electrode and the insulator because of thermal losses. U.S. Pat. No. 3,891,561 described interleaved plate generators with thin, hard, bubble-free dielectric coatings and was the first to note that higher dielectric-constant insulators had improved efficiency. U.S. Pat. No. 4,213,838 described the importance of the gas flow in the generator for cooling the generator dielectric and electrodes. U.S. Pat. No. 4,417,966 recognized the importance of a low capacitance insulator to reduce dielectric losses, and was the first to describe the improvement in performance using an AC driver based on square pulses. U.S. Pat. No. 4,614,573 described the use of a higher-efficiency alumina insulator in cylindrical geometry. U.S. Pat. No. 4,619,763 in which the output ozone gas is actively cooled. U.S. Pat. No. 5,549,874 was the first patent to explicitly describe the use of sapphire insulators, but only to improve the cleanliness of the system.

A seminal dielectric barrier discharge (DBD) patent was U.S. Pat. No. 2,010,081. While that patent used only a single insulator around the inner conductor, the description and the electrical performance was typical of later DBD ozone generators. Later DBD patents had significant improvements. U.S. Pat. No. 4,079,260 was a water-cooled DBD design that clearly identified the importance of cooling the gas. U.S. Pat. No. 4,461,744 was the first patent to show an improvement in ozone generation efficiency using shorter electrical pulses (100 ns-1 µs) that generate only arc discharges while still operating in DBD mode at a rise time >20 ns.

The ozone generator described herein uses some of the techniques described in the above patents but in different embodiments and for explicitly different reasons.

SUMMARY OF THE INVENTION

The present invention is an electrical apparatus for efficiently generating ozone in dry air or in oxygen.

This invention describes an apparatus that provides a significant improvement in the production efficiency of ozone from either dry air or from pure or nearly pure oxygen. The invention describes an apparatus for generating ozone based on a non-arcing, non-coronal-discharge cold-plasma technique. No arcs or localized discharges are formed in the new device. The described apparatus typically operates near 1 bar but is capable of operating over a wide range of pressures.

Both CD and DBD techniques generate microscopic "arcs" or localized discharges for most of time the gas is being treated. These techniques apply a DC or pulsed voltage across the gas volume that very rapidly forms a multitude of very small arcs. The arcs that are formed have high local current densities, and these arcs exist spatially very locally in the treatment volume. The arcs have a low electrical resistance for most of their existence and generate ultraviolet radiation while only generating ozone locally. Medium-energy electrons are generated in or near these arcs that interact with the gas, thereby generating ozone. The range of these electrons is short, and ozone is only created locally to the arcs.

Any ozone production technique that generates an "arc" or a local discharge is fundamentally not efficient in the production of ozone. Arcs generate a distribution of electron energies that is non-optimal for the production of ozone by impact ionization of the oxygen. In addition, arcs are prolific UV generators, and UV at wavelengths around 250 nm actually disassociates ozone rather than generating ozone. Finally, arcs generate vibrational excitation of nitrogen molecules, which thermalizes into intensified heating. All of these effects act to lower the overall ozone production efficiency of such generators.

The new apparatus of the invention generates a cold, uniform plasma at or near atmospheric pressure and does not involve the production of any arcs or any localized discharges. This new technology does not involve dielectric barrier discharges or coronal discharges. The plasma is established using pure electric-field ionization. The parameters of the cold plasma can be optimized for the generation of ozone without generating either ultraviolet radiation or arcs, while minimizing generation of atomic species that waste energy. This cold plasma fills the entire volume of the ozone generator nearly uniformly and treats the entire gas volume.

The present invention described herein uses a proprietary, high-voltage pulse generator that delivers ultra-short electrical pulses at high repetition rates to the ozone generator. No prior art exists using such ultra-short electrical drive pulses. This new pulse generator is electrically efficient (>75%) and generates electrical pulses whose voltage can be readily varied between 10 kV and 25 kV although lower and higher voltage pulses are possible depending on the details of the generator. The electrical pulse widths are typically between 10 ns and ~100 ns with pulse rise times of <5 ns. Electrical pulses shorter than ~10 ns do not generate a cold plasma in the short time allowed. Longer pulses (>100 ns) become less efficient in generating ozone as the plasma transitions from a uniform cold plasma to the distributed multiple arcs typical of a dielectric barrier discharge. If the repetition rates are too low, then a stable cold plasma does not form. Repetition rates greater than 1 kHz are necessary for reliable, uniform plasma formation. Repetition rates of 10 kHz are used to provide reasonable ozone production rates while balancing the thermal cooling requirements.

The ozone generator itself consists of a planar gas cell composed of two, 1.25-cm-thick aluminum electrodes (exact thickness not critical), each with a dielectric layer intimately bonded to one side of the aluminum or other conducting electrode. Other materials such as but not limited to copper, stainless steel, or brass can be used for the electrodes. The electrodes are arranged with the dielectric layers facing inward creating the gas volume in which the ozone is to be created. This dielectric layer on the electrode is critical as it totally isolates the metal of the electrodes from the corrosive effects of the ozone. The exposure of any metal electrode to ozone for an extended duration of time will destroy the electrodes. Only structures in which the electrodes are totally isolated from the ozone cell are appropriate for commercial ozone generators. The spacing of approximately 1 millimeter between the dielectric layers is precisely determined using accurate alumina spacers along two opposite edges of the rectangular dielectric-coated electrodes.

Gas (either dry air or oxygen) flows between the dielectric layers. The flow of the gas acts to cool the inner surface of the insulators while providing the oxygen needed to make the ozone. There is an optimum flow rate for maximum ozone concentration and another, higher, flow rate for maximum ozone production.

The electrodes are thick in order to provide a mechanically stiff electrode and a heat sink. While we use 1.25-cm thick electrodes, carefully produced somewhat thinner electrodes can provide the necessary mechanical stability. Thicker electrodes, while easily providing the necessary mechanical stability are simply wasteful in total cost. Thin electrodes warp when heated and lose intimate contact with the dielectric, thereby increasing electrical heating and lowering ozone production efficiency, due to the generation of arcs in those voids. This is a critical part of the generator structure that permits cool operation and reliable operation for thousands of hours. The dielectric insulator must be bonded with the electrode with no air gaps in order to avoid internal arcing in those voids and the resulting heating. We have used high-strength, high-temperature epoxies to create the needed intimate bond. U.S. Pat. No. 3,081,215 mentions using strong adhesives to seal the electrodes but only for isolation from the surrounding ozone to prevent corrosion.

The preferred adhesives are part of a class of high temperature epoxies used in vacuum processing. There are many examples of epoxies that have the needed performance, but two are described herein. Torr-Seal™ LVP epoxy manufactured by Varian Corp. and Locktite Hysol 1C™ (sold as Epoxy-Patch™ by Duniway) both provide the necessary mechanical and electrical performance at the elevated temperatures of ozone generators. It is critical to have the thinnest layer of epoxy possible to minimize the loss on thermal conduction through the epoxy layer. It is preferred that the electrodes be pressed firmly onto the dielectric insulator to ensure a very thin layer of epoxy. It would be useful to heat the electrode first to decrease the viscosity of the epoxy.

Additionally, the planar electrodes should have a radius of approximately 1 cm on all of the edges on the side of the electrode bonded to the insulator. This radius on the electrode removes electric field enhancement that is inherent in planar electrode configurations and prevents unwanted early formation of a plasma near the edge of the electrode. This electrode profile creates a very uniform electric field over the entire volume of the generator. Without this care, the plasma would be more intense at the edges than in the majority of the volume of the generator. Similarly, a cylindrical ozone generator would have to have electrodes that have a similar radius at both ends. A wide range of electrode profiles can generate little or no field enhancement including the so called "Chang" profiles. However, other electrode edge profiles are not excluded. The use of a simple radius in the present invention is cost driven and provides adequate performance.

The insulator should have a high thermal conductivity in order to efficiently transfer heat from the inner surface of the insulator that is in contact with the plasma. An example of an insulator having a high thermal conductivity is aluminum oxide (alumina). Alumina has a thermal conductivity of 30 W/m-K that is 27.3× higher than Pyrex™ (1.1 W/m-K) and 42.3× higher than inexpensive soda lime glasses (0.71 W/m-K) that are often used in DBD and CDE ozone generators. Sapphire has a thermal conductivity of 42 W/m-K and in cases where cost is not a factor may be used rather than alumina.

Another reason to move toward alumina vs. Pyrex™ and other glass insulators is the relatively high dielectric constant of alumina. The dielectric constant of Pyrex™ is 4.6 (varies with frequency and manufacturer), borosilicate glass is 4.6 and quartz is 3.8. The dielectric constant of alumina is 9.6-10.0 and the dielectric constant of sapphire is 9.3-11.5. The high dielectric constant of alumina forces the majority (about 90%) of the electric field in our generator construction into the gas volume, thereby more efficiently using the electrical energy applied to the system. Other higher dielectric constant insulators, such as PVDF, several metallic and rare-earth oxides, etc., are available, but the choice not to use them is due to cost, thermal performance, robustness, and complexity reasons. The present invention recognizes the need for even higher dielectric constants in alumina.

The disclosure of the present invention clearly identifies the physics justification for high dielectric constant insulators in our ozone generator and have optimized these generators around high dielectric constant insulators. Additionally, the use of very low dissipation factor insulator materials such as alumina and sapphire reduces heating directly in the dielectric. A low dissipation factor is critical for generators that use very short rise time and high frequency pulses.

Comparing the actual thermal conductivity and capacitance together, alumina that is ~2× thicker than Pyrex™ must be used to maintain comparable total generator capacitance and, hence, the "real" improvement in thermal conductivity might only be ~15. Regardless, alumina is a vastly superior dielectric.

The voltage pulse is applied to the electrodes, and the majority of the electric field appears across the gas. While the generator has many of the same elements and general configuration as a DBD generator, the short electrical pulses, the intensified electric field (5 to 10 times over DC breakdown strength), the type and thickness of the dielectric, the detailed spacing of the dielectrics, and the surface area are all provided for cold-plasma formation, not DBD arcs. The generator of the present invention uses thick electrodes for dimensional stability, uses thermoelectric cooling as well as forced air, and uses a high-temperature epoxy to provide the perfect intimate mechanical and thermal bond of the insulator to the electrode.

A block diagram of the new invention is shown in FIG. 1. A schematic of the new planar cold plasma ozone generator is shown in FIG. 2. FIG. 3 shows a schematic of a cylindrical cold plasma ozone generator.

These and other objects and features of the invention are apparent in the disclosure, which includes the above and ongoing written specification, as well as the drawings.

DETAILED DESCRIPTION OF THE DRAWINGS

Figure 1:
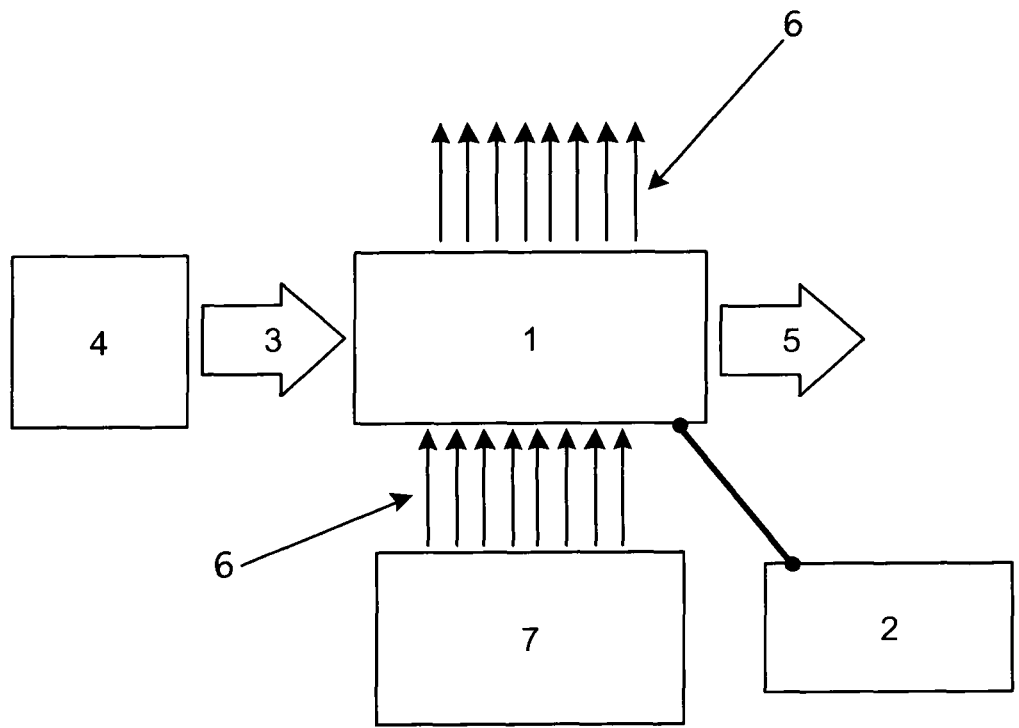
FIG. 1 is a block diagram of the electrical schematic of the ozone generating apparatus showing the electrical pulse generator, the ozone generating gas cell, and the air feed system.

FIG. 1 shows key elements of the cold plasma ozone generator system. The cold-plasma generator 1 is electrically driven by a high voltage pulser 2. Air 3 is provided to the ozone generator 1 from an air dryer 4. If pure or nearly pure oxygen is desired then the air dryer 4 is replaced with an oxygen concentrator that dries the oxygen at the same time or by bottled or liquid oxygen. The output ozone 5 is output from the ozone generator to the user. Cooling air 6 from a high velocity fan 7 is blown onto the ozone generator 1 to cool the ground and high voltage electrodes.

Figure 2:
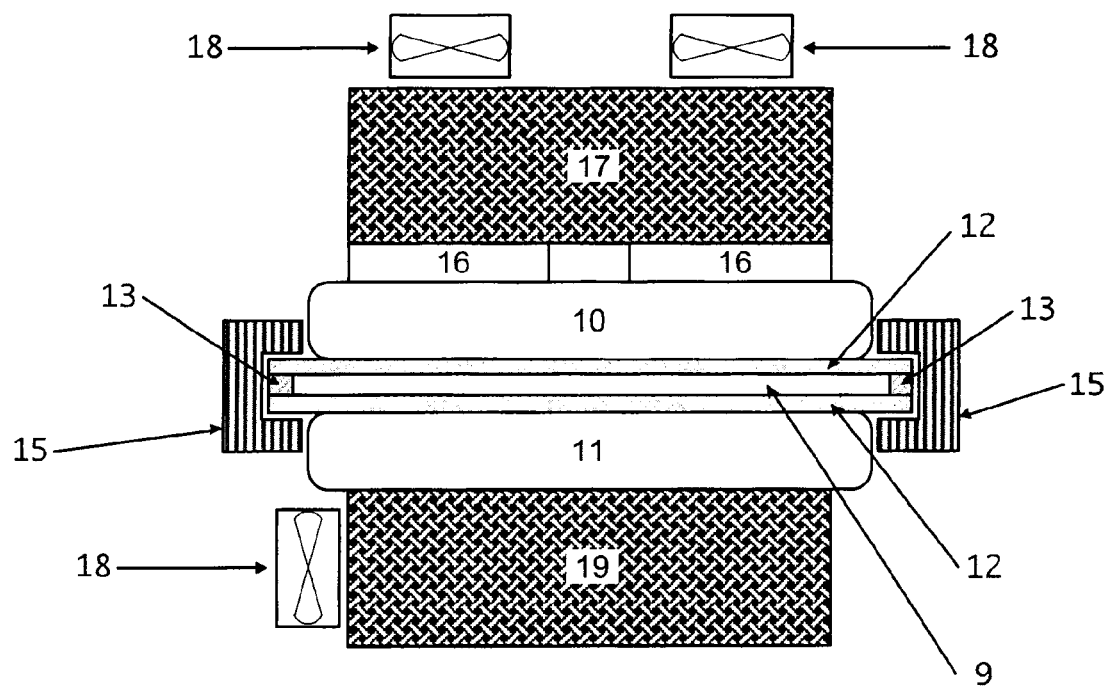
FIG. 2 is a schematic of a planar ozone generator with gas flowing from left to right. The electric field is extremely uniform in along and across the gas cell of the ozone generator. The electrodes are thick enough to act as a heat sink and are externally cooled. There is intimate electrical and thermal contact between the dielectric layers and the electrodes to eliminate arcing (and resultant heat generation) and to optimize heat flow from the interior of the gas cell to the cooled electrodes.
Figure 2:
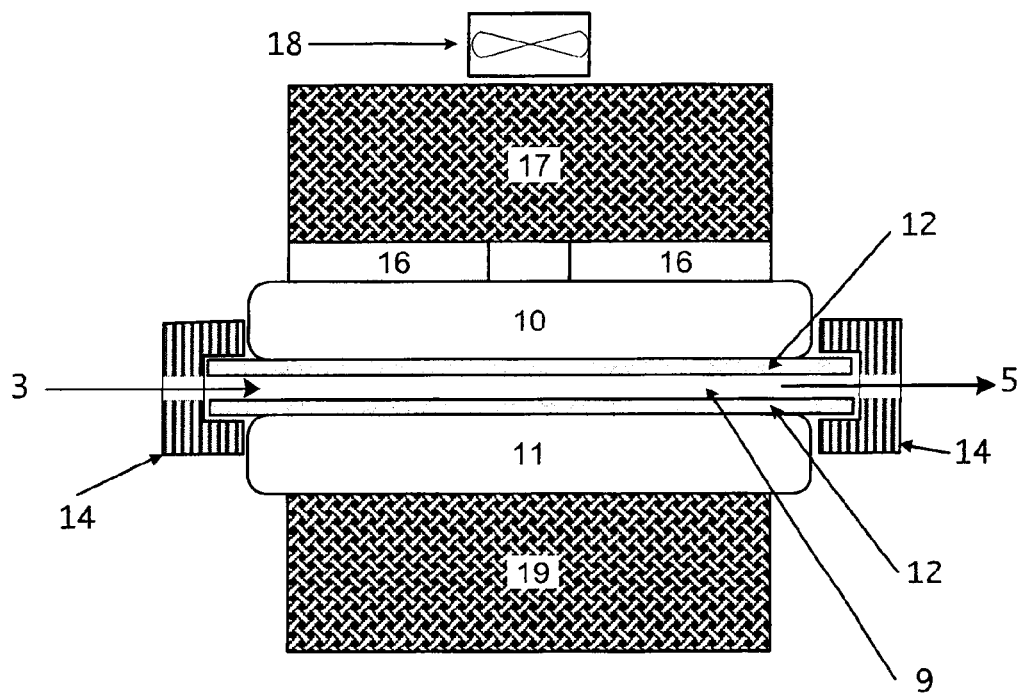

FIG. 2 shows detailed elements of a planar cold plasma ozone generator. The cold-plasma generator has two, thick aluminum-plate electrodes, the ground electrode 10 and the high voltage electrode 11. Both electrodes have thin alumina insulators 12 epoxied to one side using a high temperature epoxy. The insulators face each other and create the volume 9 in which the ozone is generated. The electrodes 10,11 together with the attached insulators 12 are spaced precisely apart using long, thin spacers of alumina 13. The spacers are epoxied to both insulators 12 so as to mechanically position the electrodes 10,11 and insulators 12 and to provide a perfect gas seal. The electrode/insulator assembly is then held at each end with gas feed plates 14 into which air 3 or oxygen flows into the generator and out of which ozonated air 5 or oxygen leaves the system. Side plates 15 are also used to provide mechanical support for the electrode/insulator assembly. The ground electrode 10 has one or more thermo-electric coolers 16 attached. A heat sink/finned radiator 17 is used and is coupled to high velocity fans 18 that together cool the ground electrode 10. The high voltage electrode 11 has an aluminum foam heat sink/air cooling block 19 attached. Another high velocity fan 18 forces air through the aluminum foam 19, thereby cooling the high-voltage electrode 11.

Figure 3:
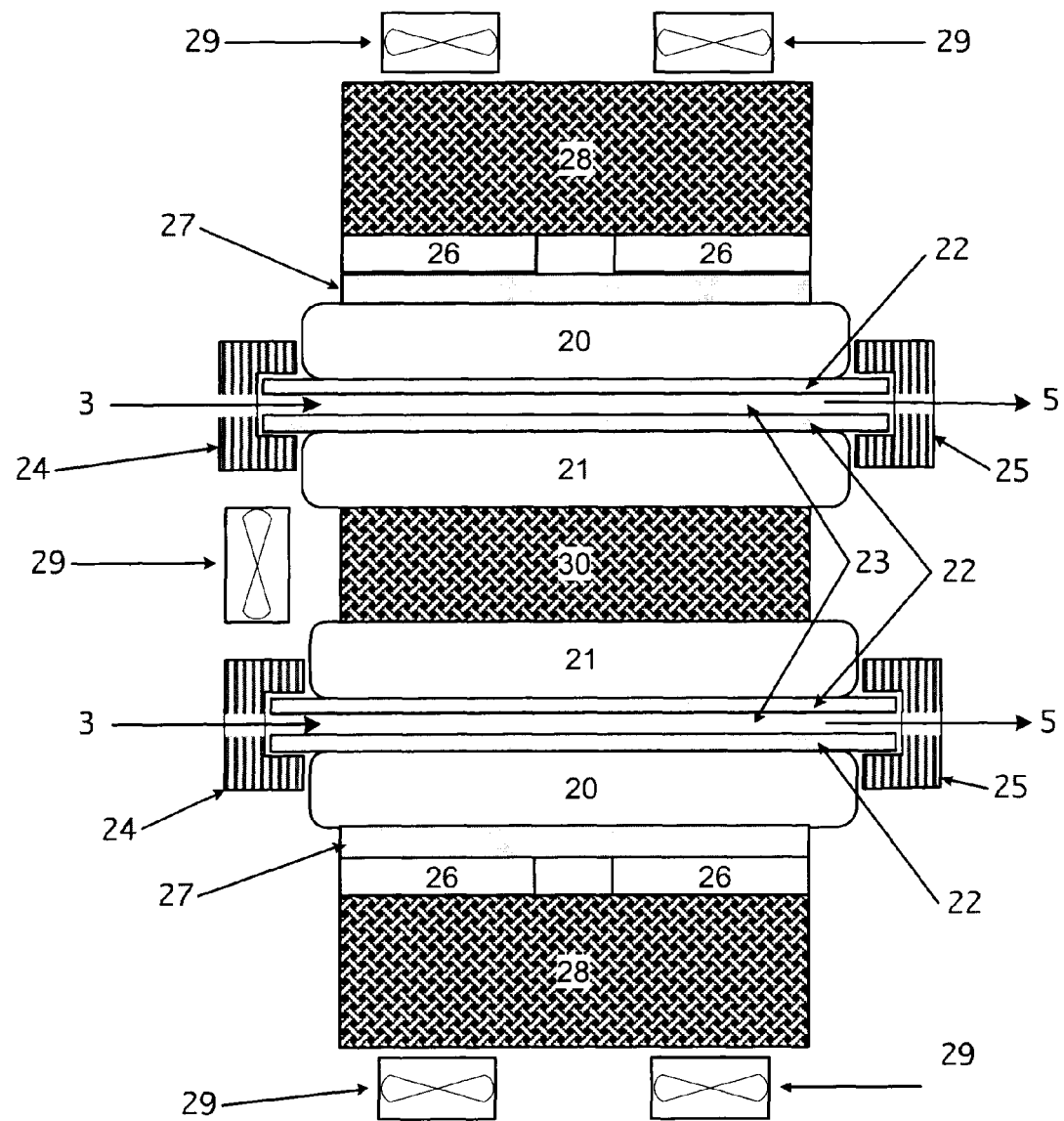
FIG. 3 is a schematic of a cylindrical ozone generator with gas flowing through the cylinder from left to right. The electric field is uniform along the generator in an axial direction but decreases only very slightly in the radial direction due to the very small radial extent of the ozone generating volume. The electrodes are thick enough to act as a heat sink and are externally cooled. There is intimate electrical and thermal contact between the dielectric layers and the electrodes to eliminate arcing (and resultant heat generation) and to optimize heat flow from the interior of the gas cell to the cooled electrodes.

FIG. 3 shows the detailed elements of a cylindrical cold-plasma ozone generator. The cold-plasma generator has two, thick cylindrical-aluminum electrodes. The ground electrode 20 is the outer electrode and the high voltage electrode 21 is the inner electrode. Both electrodes have thin, cylindrical alumina insulators 22 epoxied to one side using a high temperature epoxy. The outer electrode 20 has the alumina insulator 22 on the inside and the inner electrode 21 has the alumina insulator 22 on the outside. The insulators face each other and create the volume 23 in which the ozone is generated. The electrodes 20,21 together with the attached insulators 22 are spaced precisely apart using insulating end plates 24,25 of Lexan™ (polycarbonate). The endplates are epoxied to both insulators 22 so as to mechanically position the electrodes 20,21 and insulators 22 and to provide a perfect gas seal. Air 3 or oxygen flows into the generator through input end plate 24 and ozonated air 5 or oxygen leaves the system through the output end plate 25. The ground electrode 20 has one or more thermo-electric coolers 26 attached via a cylindrical to planar heat sink 27. A heat sink/finned radiator 28 is used and is coupled to high velocity fans 29 that together cool the outer cylindrical ground electrode 20. The inner cylindrical high voltage electrode 21 has an aluminum foam heat sink/air cooling block 30 filling the inner cylindrical void. Another high velocity fan 29 forces air through the aluminum foam 29, thereby cooling the high-voltage electrode 21.

The foregoing detailed description of the invention enables one skilled in the art to readily fabricate the disclosed generator.

Preferred Embodiment

The high-voltage electrical pulser generates pulses using solid-state switches in an inductive energy-storage configuration. The pulser can be simply optimized in pulse length, repetition rate, and absolute maximum voltage depending on the specific embodiment. The output voltage is a strong function of the impedance of the generator. Initially, the generator has a high load impedance due to the lack of a plasma and the pulser output voltage on the generator is quite high—approaching its design limit. As the plasma forms, the overall instantaneous impedance of the generator falls and the voltage on the generator almost instantaneously decreases to hold the power delivered to the generator constant.

An inductive voltage generator has better driver characteristics than a pulser that uses a capacitive energy store system. In inductive pulser schemes, the voltage on the generator will increase until plasma forms and then the voltage falls as the plasma forms. If the plasma begins to quench, the pulser voltage will increase in order to sustain the plasma. This concept provides a very stable plasma source and is insensitive to changes in the gas pressure and gas content. In addition, inductive energy storage pulsers operate with low input voltages and can be precisely tuned for a fixed pulse width. Capacitive-based pulsers, on the other hand, have a single maximum voltage that can be delivered to the generator. This same maximum voltage will always be applied to the generator regardless of the plasma conditions. Depending on the switching technology used, a capacitive-energy storage pulser can have a short well-defined pulse width but the voltage delivered depends on the charge voltage of the system and the size of the storage capacitor not the instantaneous impedance of the load. Such pulsers often drive plasmas into arc generation.

The preferred embodiment uses an inductive energy-storage pulser that operates with a peak voltage of 15 kV to 25 kV; has a pulse repetition rate of 10 kHz; and has a pulse width of 20 nanoseconds (ns). While a wide range of pulser parameters are possible, these parameters are nearly optimum for high efficiency ozone production in our generator.

The ozone generator is preferably planar. The electrodes have typical dimensions of 10 cm in width and 20 cm in length. The overall area of the generator is important for the optimal efficiency. A generator that is too small for the output voltage (and power) of the pulser will have an average voltage that is too high for the most efficient generation of ozone, while a generator that is too large for the output voltage (and power) of the generator will not form a uniform plasma over the entire area of the electrodes. The gap of between the dielectric layers is designed to provide an electric field that is optimum for the generation of the cold plasma and is 1-millimeter thick for our preferred embodiment. This gap is also related to the composition of the dielectric that is used. Aluminum oxide (alumina) is preferably used as the dielectric. Alumina is inexpensive, readily available in a range of sizes, and is produced with excellent mechanical tolerances.

The preferred embodiment also is designed to keep all of the components of the ozone generator as cool as possible. This is critical because ozone is destroyed by heat. The temperature of the system is cooled by use of fans and ducted high-velocity air on the high voltage side of the generator and thermo-electric coolers on the ground side of the generators. Additionally, the flow of air through the generator helps to cool the inner insulator surfaces of the generator.

OTHER EMBODIMENTS

While the preferred embodiment geometry is planar because of the precise control that such geometries provide to the generated electric fields and the uniformity of the airflow—other geometries are possible. Co-axial, cylindrical geometries (FIG. 3) that have been built and tested work well, although not quite as efficiently as the planar geometries. Cylindrical geometries are more costly and one is limited to a narrow range of material sizes due to restricted material availability. It becomes more difficult to make a thin intimate connection to the insulators. In addition, it becomes difficult to cool the high voltage electrode and to uniformly cool the external ground electrode.

Multiple generators can be placed in parallel to increase the ozone generating capacity of the entire system. This would likely require a separate electrical pulser for each individual generator. It is also possible to build larger, higher-power electrical pulsers that can drive larger area generators. The generator design of the present invention is optimized for cost and availability of the pulser and the ease in fabrication of the generator itself.

Other dielectric materials are possible instead of alumina or sapphire. As previously discussed the use of glass dielectrics such as but not limited to Pyrex™ are possible, wherein the development of new dielectric insulators may have superior performance characteristics over alumina or sapphire.

Further, a wide range of electrode materials is possible besides aluminum. While aluminum was discussed for cost and machining concerns, conducting materials such as but not limited to copper, brass, nickel, and steel are all options.

While the invention has been described with reference to specific embodiments, modifications and variations of the invention may be constructed without departing from the scope of the invention.

We claim:

1. An apparatus comprising a cold-plasma ozone generator, the ozone generator comprising: a non-arcing non-coronal ozone production cell capable of generating ozone; the ozone production cell having a pair of electrodes placed on two sides of the production cell and spaced apart by an electrode gap, and a dielectric layer intimately bonded to each of the electrodes with the dielectric layers facing inward in the ozone production cell; a high-voltage pulse generator attached to the electrodes and configured for producing a glow discharge cold plasma between the electrodes, the high voltage pulse generator being able to produce sufficient voltage to generate the glow discharge cold plasma; a cooling system attached to each of the electrodes; and an oxygen source adapted to provide gas flow through the production cell in the gap between the pair of electrodes that efficiently generates ozone in the cold plasma, the high voltage pulse generator being capable of producing high-voltage electrical pulses in the range of up to 100 ns at peak electric field strength of approximately 100 KV/cm to 50 KV/cm (depending on the pulse duration), and with a repetition rate of 10 kHz or more at or about 1-bar pressure.

2. The apparatus of claim 1, wherein the pulse generator is based on an inductive energy store-base technology.

3. The apparatus of claim 1, wherein the electrodes are metal electrodes, wherein the dielectric layers are alumina insulators intimately bonded to the metal electrodes using high-strength and high-temperature, electrically and thermally conducting adhesives, and wherein the metal electrodes have a thickness 0.5 cm or greater, and are rounded at edges and corners thereof, thereby creating uniform electric fields in the ozone production cell.

4. The apparatus of claim 1, in which the electrodes are planar in shape and are spaced by the electrode gap with precision spacing of approximately 1 to 1.5 millimeters.

5. The apparatus of claim 1, in which the cooling system provides active cooling of the electrodes using thermoelectric coolers.

6. The apparatus of claim 1, in which the pulse generator operates at repetition rates of 10 kHz.

7. The apparatus of claim 1, in which pulse generator operates at pulse widths of 10 ns to 50 ns.

8. The apparatus of claim 1, in which the dielectric layers are sapphire insulators.

9. The apparatus of claim 1, wherein the gas flow is dry air.

10. The apparatus of claim 1, wherein the gas flow is oxygen.

11. The apparatus of claim 1, in which the electrodes are cylindrical and are arranged co-axially.

12. The apparatus of claim 11, in which the cooling system provides active cooling of the electrodes using thermoelectric coolers.

13. The apparatus of claim 11, in which the pulse generator operates at repetition rates greater than 10 kHz.

14. The apparatus of claim 11, in which the pulse generator operates at pulse widths up to 100 ns.

15. The apparatus of claim 11, in which the dielectric layers are sapphire insulators.

16. The apparatus of claim 11, wherein the oxygen source is an air dryer or an oxygen concentrator adapted to provide the gas flow as dry air.

17. The apparatus of claim 11, wherein the gas flow is provided as pure oxygen.

18. The apparatus of claim 11, which is extended in size, drive power, and flow volume, but not the electrode gap spacing, as needed to achieve an extremely large ozone production rate.

19. Apparatus comprising:
- a non-arcing non-corona discharge commercial planar cold plasma ozone generator comprising:
- an ozone production cell capable of generating ozone;
- a pair of electrodes placed on two sides of the production cell;
- a high-voltage pulse generator attached to the electrodes and configured for producing a glow discharge cold plasma between the electrodes, the high voltage pulser being able to produce sufficient voltage to generate a glow discharge cold plasma;
- a cooling system attached to each of the electrodes;
- an oxygen source adapted to provide gas flow through the production cell between the pair of electrodes;
- a dry air or oxygen inlet connected to a first end of the planar gas cell, and
- an ozone outlet connected to an opposite second end of the planar gas cell;
- wherein the production cell is a planar gas cell;
- wherein the pair of electrodes further comprise two thick aluminum, brass, stainless steel or copper electrodes 1.25 cm or more in thickness,
- wherein each electrode has a dielectric insulator layer intimately bonded with no air gaps to the electrode with strong high temperature epoxy adhesives to seal the electrode for isolation from ozone within the ozone production cell,
- wherein the electrodes have about 1 cm radii on all edges on sides bonded to the insulator layers,
- the electrodes have dimensions of about 10 cm in width and about 20 cm in length,
- the electrodes are spaced apart about 1.0 to 1.5 mm by thin spacers of alumina,
- wherein the high voltage pulse generator is configured to operate at a peak voltage of about 15 KV to 25 KV and a pulse repetition rate of about 10 kHz and a pulse width of about 20 ns, and
- wherein the cooling system comprises coolers connected to the electrodes for cooling the electrodes.

20. The apparatus of claim 19, wherein the dielectric insulator layers are alumina layers, and no arcs or UV generation occur in the production cell which operates at one atmosphere.

* * * * *